Patented Feb. 12, 1924.

1,483,689

UNITED STATES PATENT OFFICE.

WILLIAM R. SMITH, OF BUFFALO, NEW YORK.

TUBULAR TILE.

Application filed September 24, 1923. Serial No. 664,488.

*To all whom it may concern:*

Be it known that I, WILLIAM R. SMITH, a citizen of the United States, residing at Buffalo, in the county of Erie and State of New York, have invented new and useful Improvements in Tubular Tiles, of which the following is a specification.

The object of this invention is to provide a tubular tile of greater porosity than the earthernware tile in common use, and adapted to permit water to percolate freely through the wall of the tile, so that drainage may be more rapidly effected by a line of tiles laid below the surface of the ground than by a line of ordinary earthenware tiles of limited porosity and depending, for the entrance of water into their bores, mainly on loose or open joints between adjacent ends of the tiles.

I attain this object as hereinafter described.

In carrying out my invention, I form a mixture of ingredients including hard porous coarse material in the form of lumps or fragments which may be of various sizes, powdered material and hydraulic cement, such as the well known Portland cement. To the mixture I add sufficient water to crystallize the cement. The mixture is molded while plastic and before the crystallization of the cement, into a tubular tile of any suitable form, the tile being subsequently solidified by the crystallization of the cement.

The preferred ingredients, other than the cement, are preferably the cinders and ashes constituting the solid products of combustion of coal. The larger cinders are reduced by crushing, so that the greatest dimension of any lump is approximately one inch or less, although this dimension may be varied within reasonable limits. Some of the lumps may be considerably smaller. The spaces between the lumps are filled by the ashes and the cement.

I find that satisfactory results may be produced by using the ingredients in the proportion of about one-sixth by weight of the cement, to about five-sixths by weight of a mixture of cinders and ashes, the relative proportions of the cinders and the ashes being as usually found in the ash pit of a furnace. In some cases the proportion of cinders is greater and in other cases less than the proportion of ashes.

The cinders resulting from the combustion of coal are so porous that water can percolate very freely through them and through the wall of a tile made as above described. Some of the cinders are flush with the external surface, and others with the internal surface of the tile. The intermediate cinders contact at frequent points with each other and with the surface cinders, so that water may seep through the cinders without being obstructed by the cement. The mixture of cement and ashes is also porous.

A line of said tiles with or without open joints between adjacent tiles, is adapted to drain land with a very satisfactory degree of rapidity.

I have found that the finer material or ashes, and the hydraulic cement, constitute a porous binder which adheres firmly to the rigid lumps or cinders, and fills the interstices therebetween, so that the wall of the tile does not contain open spaces between the lumps, and is characterized by uniform porosity and uniform rigidity or resistance to crushing pressure, throughout any section of the tile. In other words, if the tile were cut in two, either longitudinally or transversely, the faces formed by the cut would be solid and continuous, and would have no pits or depressions, such as would appear if the wall of the tile contained open spaces.

It is essential that the cement employed be hydraulic cement. The crystallization of this cement, caused by the reaction of water thereon, imparts rigidity to the binder, without interfering with its porosity, and causes the firm adhesion of the binder to the lumps.

In the accompanying drawing:—

Figure 1 is a perspective view of a drain tile constructed in accordance with the present invention.

Figure 2 is a sectional view of a portion of the tile, on an enlarged scale.

In the drawing the reference character A indicates the lumps or fragments of hard, porous, coarse material, and B the porous binder composed of a mixture of hydraulic cement and ashes.

The drawing clearly illustrates the important feature of the invention, namely that there are no open, or unfilled, spaces between or among the lumps of porous material A. The porous binder B fills all of the spaces formed between the several lumps A.

I claim:

1. A porous tile composed of a mixture of ingredients including rigid coarse porous material in the form of lumps of irregular shape, finer material, and hydraulic cement, sufficient water being added to the mixture to crystallize the cement, the said mixture being molded into tile form and solidified by the crystallization of the cement, which is in suitable quantity to form, with the finer material, a rigid porous binder adhering firmly to the rigid lumps, and filling the interstices therebetween, so that the wall of the tile does not contain open spaces between the lumps, and is uniformly porous and rigid throughout any section of the tile.

2. A porous tile composed of a mixture of ingredients including cinders in the form of porous lumps of irregular shape, ashes, and hydraulic cement, sufficient water being added to the mixture to crystallize the cement, the said mixture being molded into tile form and solidified by the crystallization of the cement which is in suitable quantity to form, with the ashes, a rigid porous binder adhering firmly to the rigid lumps and filling the interstices therebetween, so that the wall of the tile does not contain open spaces between the lumps, and is uniformly porous and rigid, throughout any section of the tile.

In testimony whereof I have affixed my signature.

WILLIAM R. SMITH.